United States Patent
Mantell et al.

(10) Patent No.: US 10,870,235 B2
(45) Date of Patent: Dec. 22, 2020

(54) METHOD FOR OPERATING A MULTI-NOZZLE EXTRUDER USING ZIG-ZAG PATTERNS THAT PROVIDE IMPROVED STRUCTURAL INTEGRITY

(71) Applicant: Xerox Corporation, Norwalk, CT (US)

(72) Inventors: David A. Mantell, Rochester, NY (US); Peter J. Nystrom, Webster, NY (US); Christopher G. Lynn, Wolcott, NY (US); Jason O'Neil, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 357 days.

(21) Appl. No.: 15/961,256

(22) Filed: Apr. 24, 2018

(65) Prior Publication Data
US 2019/0322043 A1  Oct. 24, 2019

(51) Int. Cl.
*B29C 64/209* (2017.01)
*B33Y 50/02* (2015.01)
(Continued)

(52) U.S. Cl.
CPC .......... *B29C 64/209* (2017.08); *B29C 64/106* (2017.08); *B29C 64/393* (2017.08);
(Continued)

(58) Field of Classification Search
CPC ... B29C 64/209; B29C 64/393; B29C 64/106; B29C 64/118; B29C 64/112;
(Continued)

(56) References Cited

U.S. PATENT DOCUMENTS 5,740,051 A    4/1998  Sanders, Jr. et al.
6,129,872 A  * 10/2000  Jang ........................ B29C 64/40
                                            264/75
(Continued)

FOREIGN PATENT DOCUMENTS

WO    20170130515    8/2017

OTHER PUBLICATIONS

European Search Report corresponding to European Patent Application 19170354.5, European Patent Office, Munich, Germany, Oct. 31, 2019 (10 pages).

*Primary Examiner* — Jeffrey M Wollschlager
(74) *Attorney, Agent, or Firm* — Maginot Moore & Beck LLP

(57) ABSTRACT

An additive manufacturing system operates an actuator to move an extruder with reference to a selected first zig-zag pattern to sparsely fill an interior region of an object by extruding a swath of thermoplastic material that has straight portions connected by angled portions. After a first pass using the first zig-zag pattern is completed, a second zig-zag pattern is used to form a complementary swath that forms rigid structure with the first swath. Use of the two patterns is alternated to sparsely fill the interior region in multiple layers of the object until a predetermined distance from a solid fill structure or surface is detected. Transition patterns are then used to increase the density of the swaths in the interior region in the next successive layers of the object until the layer is reached where a solid fill surface is formed over the swaths formed using the transition patterns.

19 Claims, 8 Drawing Sheets

(51) Int. Cl.
*B29C 64/393* (2017.01)
*B33Y 10/00* (2015.01)
*B33Y 30/00* (2015.01)
*B29C 64/106* (2017.01)
*B29K 101/12* (2006.01)
*B33Y 70/00* (2020.01)

(52) U.S. Cl.
CPC ............... *B33Y 10/00* (2014.12); *B33Y 30/00* (2014.12); *B33Y 50/02* (2014.12); *B29K 2101/12* (2013.01); *B33Y 70/00* (2014.12)

(58) Field of Classification Search
CPC ......... B33Y 50/02; B33Y 10/00; B33Y 30/00; B33Y 70/00; B29K 2101/12
See application file for complete search history.

(56) References Cited

U.S. PATENT DOCUMENTS

| | | | |
|---|---|---|---|
| 6,682,684 B1 | 1/2004 | Jamalabad et al. | |
| 8,827,684 B1* | 9/2014 | Schumacher | B29C 64/118 425/375 |
| 10,183,442 B1* | 1/2019 | Miller | B29C 64/118 |
| 2014/0371895 A1* | 12/2014 | Sadusk | B33Y 10/00 700/98 |
| 2015/0093465 A1* | 4/2015 | Page | B29C 64/393 425/132 |
| 2016/0067928 A1* | 3/2016 | Mark | B29C 70/16 264/401 |
| 2016/0257033 A1* | 9/2016 | Jayanti | B29C 64/40 |
| 2016/0325498 A1* | 11/2016 | Gelbart | B22D 23/003 |
| 2016/0346999 A1* | 12/2016 | Patrov | B29C 64/386 |
| 2017/0113409 A1* | 4/2017 | Patrov | B29C 64/106 |
| 2017/0136703 A1* | 5/2017 | Hayes | B29C 64/386 |
| 2017/0157828 A1* | 6/2017 | Mandel | B29C 64/321 |
| 2017/0157831 A1* | 6/2017 | Mandel | B29C 48/266 |
| 2017/0176979 A1* | 6/2017 | Lalish | B29C 64/386 |
| 2017/0217088 A1* | 8/2017 | Boyd, IV | B29C 64/106 |
| 2017/0329878 A1* | 11/2017 | Gondek | B29C 64/386 |
| 2018/0236728 A1* | 8/2018 | Hovanec | B33Y 50/02 |
| 2018/0281171 A1* | 10/2018 | Rajendra Zanpure | B29C 64/00 |
| 2019/0030822 A1* | 1/2019 | Touma | B29C 64/393 |
| 2019/0255764 A1* | 8/2019 | August | H04N 1/00244 |

\* cited by examiner

METHOD FOR OPERATING A MULTI-NOZZLE EXTRUDER USING ZIG-ZAG PATTERNS THAT PROVIDE IMPROVED STRUCTURAL INTEGRITY

TECHNICAL FIELD

This disclosure is directed to multi-nozzle extruders used in three-dimensional object printers and, more particularly, to the formation of structural features in fill-in areas to support a surface.

BACKGROUND

Three-dimensional printing, also known as additive manufacturing, is a process of making a three-dimensional solid object from a digital model of virtually any shape. Many three-dimensional printing technologies use an additive process in which an additive manufacturing device forms successive layers of the part on top of previously deposited layers. Some of these technologies use extruders that soften or melt extrusion material, such as ABS plastic, into thermoplastic material and then emit the thermoplastic material in a predetermined pattern. The printer typically operates the extruder to form successive layers of the thermoplastic material that form a three-dimensional printed object with a variety of shapes and structures. After each layer of the three-dimensional printed object is formed, the thermoplastic material cools and hardens to bond the layer to an underlying layer of the three-dimensional printed object. This additive manufacturing method is distinguishable from traditional object-forming techniques, which mostly rely on the removal of material from a work piece by a subtractive process, such as cutting or drilling.

Many existing three-dimensional printers use a single extruder that extrudes material through a single nozzle. The extruder moves in a predetermined path to extrude the build material onto selected locations of a support member or previously deposited swaths of extruded material of the three-dimensional printed object based on model data for the three-dimensional printed object. The model data is processed into cross-sectional layers for the object to be manufactured with each layer corresponding approximately to the thickness of a single swath of extruded material. Using an extruder having only a single nozzle to extrude the build material often requires considerable time to form a three-dimensional printed object. Additionally, an extruder with a larger nozzle diameter can form a three-dimensional printed object more quickly but loses the ability to emit build material in finer shapes for higher detailed features while nozzles with narrower diameters can form detailed structures but require more time to build the three-dimensional object.

To address the limitations of single nozzle extruders, multi-nozzle extruders have been developed. In these multi-nozzle extruders, the nozzles are formed in a common faceplate and the materials extruded through the nozzles can come from one or more manifolds. In extruders having a single manifold, all of the nozzles extrude the same material, but the fluid path from the manifold to each nozzle can include a valve that is operated to open and close the nozzles selectively. This ability enables the shape of the swath of thermoplastic material extruder from the nozzles to be varied by changing the number of nozzles extruding material and which ones are extruding material. In extruders having different manifolds, each nozzle can extrude a different material with the fluid path from one of the manifolds to its corresponding nozzle including a valve that can be operated to open and close the nozzle selectively. This ability enables the composition of the material in a swath to vary as well as the shape of the swath of thermoplastic material extruder from the nozzles to be varied. Again, these variations are achieved by changing the number of nozzles extruding material and which ones are extruding material. These multi-nozzle extruders enable different materials to be extruded from different nozzles and used to form an object without having to coordinate the movement of different extruder bodies. These different materials can enhance the ability of the additive manufacturing system to produce objects with different colors, physical properties, and configurations. Additionally, by changing the number of nozzles extruding material, the size of the swaths produced can be altered to provide narrow swaths in areas where precise feature formation is required, such as object edges, and to provide broader swaths to quickly form areas of an object, such as its interior regions.

In these multi-nozzle extruders having their nozzles in a common faceplate, the movement of the faceplate with reference to the build platform as well as the orientation of the faceplate with respect to the axes of the platform are critical to the formation of a swath. As used in this document, a "swath" refers to the extrusion of material from any opened nozzle in a multi-nozzle extruder as an aggregate as long as at least one nozzle remains open and material is extruded from any opened nozzle. That is, even if multiple nozzles are opened, but not all of the emitted extrusions contact one another, the discrete extrusions constitute a swath. A contiguous swath is one in which all of the extrusions from multiple nozzles are in contiguous contact across the swath in a cross-process direction.

Within a layer of an object being formed are surface regions, transition regions, and interior regions. The interior regions of an object can be sparsely filled since they are not observable. These regions must have enough structure and rigidity that they can support transition and surface structures that need to be formed over the interior regions. Additionally, having these interior regions contribute to the overall rigidity of the object is advantageous. Finding an appropriate balance between the amount of extruded material required in these different types of regions is important in object manufacture. In manufacturing systems that form objects with a multi-nozzle extruder, the extruder can be moved along the 0°-180° (X) axis or the 90°-270° (Y) axis, as shown in FIG. 8. Extruding along these axes enable all nine nozzles of the depicted extruder to contribute to the formation of a contiguous swath and the swath has its greatest width. As used in this document, the term "0°-180° axis" means movement in either the 0° direction or the 180° direction with the faceplate of the extruder oriented so if all of the nozzles are open, then the most efficiently produced contiguous swath that the extruder can produce is formed and the term "90°-270° axis" means movement in either the 90° or the 270° direction with the faceplate of the extruder oriented so if all of the nozzles are open, then the most efficiently produced contiguous swath that the extruder can produce is formed. The contiguous swath is produced efficiently because all of the nozzles are equally spaced apart perpendicular to the direction of movement. For solidly filling an interior region, the extruder can be moved bidirectionally in the 0° direction for one layer and bidirectionally in the 90° direction in the next layer. Printing these interior regions with sparse patterns, however, presents problems because this orthogonal alternating printing pattern for the layers requires swaths in different layers to cross one another perpendicularly. Without solid support beneath crossing swaths, the current extrusion tends to be discontinuous after passing over the perpendicular swath. This lack of continuity compromises the structural integrity of the region and adversely impacts its ability to support a surface formed over the region. Operating a three-dimensional object printer having a multi-nozzle extruder with a common faceplate to fill interior regions of an object without compromising the structural integrity of the object would be beneficial.

SUMMARY

A new method of operating a multi-nozzle extruder enables interior regions to be formed sparsely in a manner that provides structural integrity previously unknown. The method includes selecting with the controller a first zig-zag pattern from a plurality of zig-zag patterns stored in a memory operatively connected to the controller, operating an actuator with the controller to move an extruder in an interior region in a first object layer, the movement of the extruder being relative to a platform supporting an object being manufactured to form swaths in the interior region in the first object layer with reference to the first zig-zag pattern while extruding swaths of thermoplastic material through a plurality of nozzles in the extruder, the swaths of thermoplastic material in the interior region of the first object layer having straight portions and angled portions in the interior region in the first object layer at a first orientation. The method continues by selecting a second zig-zag pattern from the plurality of zig-zag patterns stored in the memory, and operating the actuator with the controller to move the extruder in the interior region in a second object layer that is adjacent to the first object layer, the movement of the extruder being relative to the platform to form swaths in the interior region in the second object layer with reference to the second zig-zag pattern while extruding swaths of thermoplastic material through the plurality of nozzles in the extruder, the swaths of thermoplastic material in the interior region of the second object layer having straight portions and angled portions in the interior region in the second object layer at a second orientation, the first orientation and the second orientation being at different angles with reference to straight line movement of the extruder during swath formation.

BRIEF DESCRIPTION OF THE DRAWINGS

The foregoing aspects and other features of operating a multi-nozzle extruder using zig-zag patterns to form support structures in sparsely filled interior regions with improved structural integrity in a 3D object are explained in the following description, taken in connection with the accompanying drawings.

DETAILED DESCRIPTION

Figure 1:
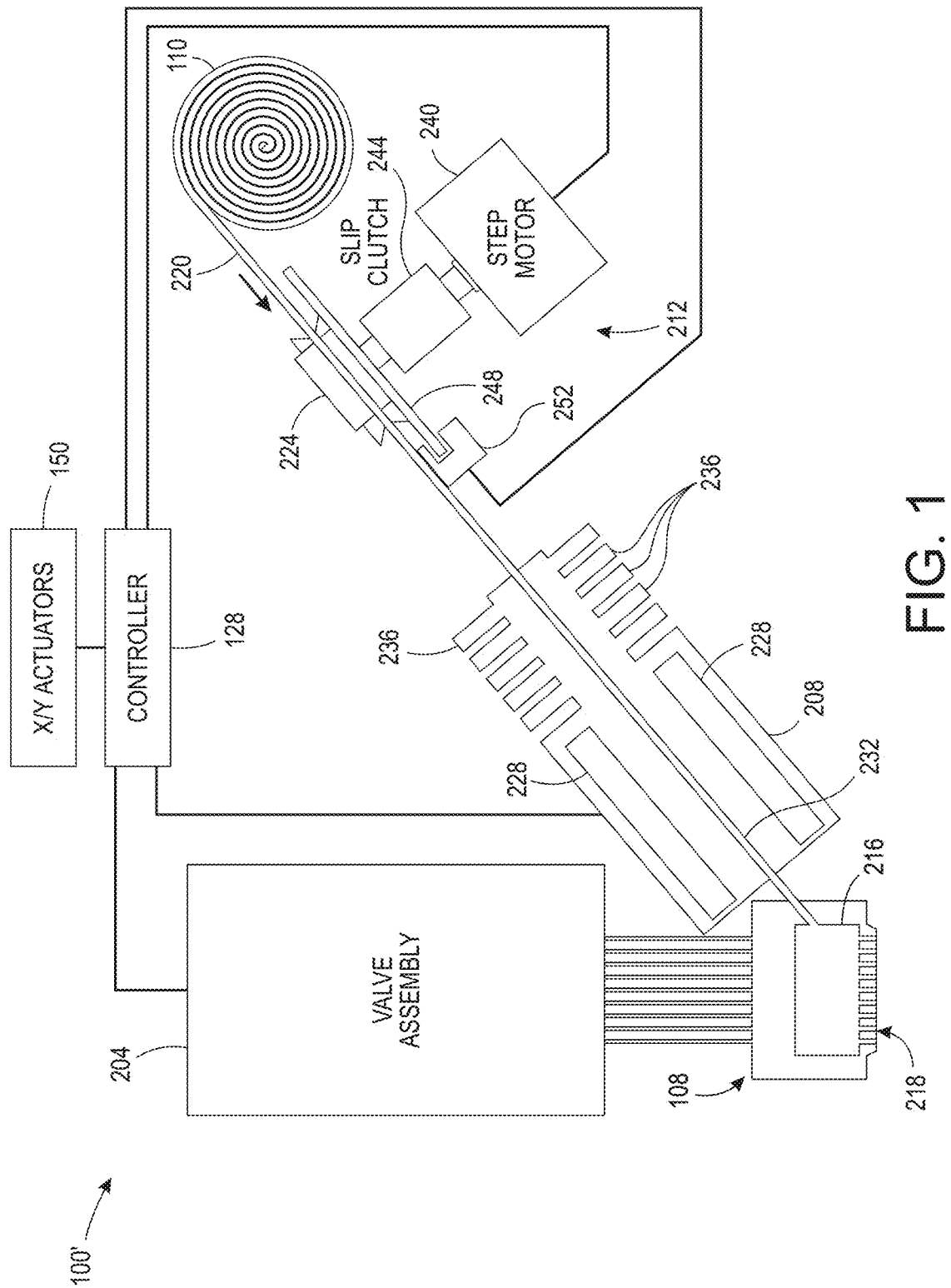
FIG. 1 depicts an additive manufacturing system that operates a multi-nozzle extruder in a way that improves the structural integrity of areas filled with sparse patterns.

For a general understanding of the environment for the device disclosed herein as well as the details for the device, reference is made to the drawings. In the drawings, like reference numerals designate like elements.

As used herein, the term "extrusion material" refers to a material that is typically softened or melted to form thermoplastic material to be emitted by an extruder in an additive manufacturing system. The extrusion materials include, but are not strictly limited to, both "build materials" that form permanent portions of the three-dimensional printed object and "support materials" that form temporary structures to support portions of the build material during a printing process and are then optionally removed after completion of the printing process. Examples of build materials include, but are not limited to, acrylonitrile butadiene styrene (ABS) plastic, polylactic acid (PLA), aliphatic or semi-aromatic polyamides (Nylon), plastics that include suspended carbon fiber or other aggregate materials, electrically conductive polymers, and any other form of material that can be thermally treated to produce thermoplastic material suitable for emission through an extruder. Examples of support materials include, but are not limited to, high-impact polystyrene (HIPS), polyvinyl alcohol (PVA), and other materials capable of extrusion after being thermally treated. Extrusion materials also include materials other than thermoplastic polymers, such as chocolate. In some extrusion printers, the extrusion material is supplied as continuous elongated length of material commonly known as a "filament." This filament is provided in a solid form by one or more rollers pulling the extrusion material filament from a spool or other supply and feeding the filament into a heater that is fluidly connected to a manifold within the extruder. Although the illustrated examples use extrusion material that is supplied as filament to the heaters, other extrusion material supplies can be used, such as particulate or spherical ball extrusion materials. The heater softens or melts the extrusion material filament to form a thermoplastic material that flows into the manifold. When a valve positioned between a nozzle and the manifold is opened, a portion of the thermoplastic material flows from the manifold through the nozzle and is emitted as a stream of thermoplastic material. As used herein, the term "melt" as applied to extrusion material refers to any elevation of temperature for the extrusion material that softens or changes the phase of the extrusion material to enable extrusion of the thermoplastic material through one or more nozzles in an extruder during operation of a three-dimensional object printer. The melted extrusion material is also denoted as "thermoplastic material" in this document. As those of skill in the art recognize, certain amorphous extrusion materials do not transition to a pure liquid state during operation of the printer.

As used herein, the terms "extruder" refers to a component of a printer that melts extrusion material in a single fluid chamber and provides the melted extrusion material to a manifold connected to one or more nozzles. Some extruders include a valve assembly that can be electronically operated to enable thermoplastic material to flow through nozzles selectively. The valve assembly enables the one or more nozzles to be connected to the manifold independently to extrude the thermoplastic material. As used herein, the term "nozzle" refers to an orifice in an extruder that is fluidly connected to the manifold in an extruder and through which thermoplastic material is emitted towards a material receiving surface. During operation, the nozzle can extrude a substantially continuous linear swath of the thermoplastic material along the process path of the extruder. A controller operates the valves in the valve assembly to control which nozzles connected to the valve assembly extrude thermoplastic material. The diameter of the nozzle affects the width of the line of extruded thermoplastic material. Different extruder embodiments include nozzles having a range of orifice sizes with wider orifices producing lines having widths that are greater than the widths of lines produced by narrower orifices.

As used herein, the term "manifold" refers to a cavity formed within a housing of an extruder that holds a supply of thermoplastic material for delivery to one or more nozzles in the extruder during a three-dimensional object printing operation. As used herein, the term "swath" refers to any pattern of the extrusion material that the extruder forms on a material receiving surface during a three-dimensional object printing operation. Common swaths include straight-line linear arrangements of extrusion material and curved swaths. In some configurations, the extruder extrudes the thermoplastic material in a continuous manner to form the swath with a contiguous mass of the extrusion material in both process and cross-process directions, while in other configurations the extruder operates in an intermittent manner to form smaller groups of thermoplastic material that are arranged along a linear or curved path. The three-dimensional object printer forms various structures using combinations of different swaths of the extrusion material. Additionally, a controller in the three-dimensional object printer uses object image data and extruder path data that correspond to different swaths of extrusion material prior to operating the extruder to form each swath of extrusion material. As described below, the controller optionally adjusts the operation of the valve assembly and the speed at which the extruder is moved to form multiple swaths of thermoplastic material through one or more nozzles during a three-dimensional printing operation.

As used herein, the term "process direction" refers to a direction of relative movement between an extruder and a material receiving surface that receives thermoplastic material extruded from one or more nozzles in the extruder. The material receiving surface is either a support member that holds a three-dimensional printed object or a surface of the partially formed three-dimensional object during an additive manufacturing process. In the illustrative embodiments described herein, one or more actuators move the extruder about the support member, but alternative system embodiments move the support member to produce the relative motion in the process direction while the extruder remains stationary. Some systems use a combination of both systems for different axes of motion.

As used herein, the term "cross process direction" refers to an axis that is perpendicular to the process direction and parallel to the extruder faceplate and the material receiving surface. The process direction and cross-process direction refer to the relative path of movement of the extruder and the surface that receives the thermoplastic material. In some configurations, the extruder includes an array of nozzles that can extend in the process direction, the cross-process direction, or both. Adjacent nozzles within the extruder are separated by a predetermined distance in the cross-process direction. In some configurations, the system rotates the extruder to adjust the cross-process direction distance that separates different nozzles in the extruder to adjust the corresponding cross-process direction distance that separates the lines of thermoplastic material that are extruded from the nozzles in the extruder as the lines form a swath.

During operation of the additive manufacturing system, an extruder moves in the process direction along both straight and curved paths relative to a surface that receives thermoplastic material during the three-dimensional object printing process. Additionally, an actuator in the system optionally rotates the extruder about the Z axis to adjust the effective cross-process distance that separates nozzles in the extruder to enable the extruder to form two or more lines of thermoplastic material with predetermined distances between each line of the thermoplastic material. The extruder moves both along the outer perimeter to form outer walls of a two-dimensional region in a layer of the printed object and within the perimeter to fill all or a portion of the two-dimensional region with the thermoplastic material.

Figure 6:
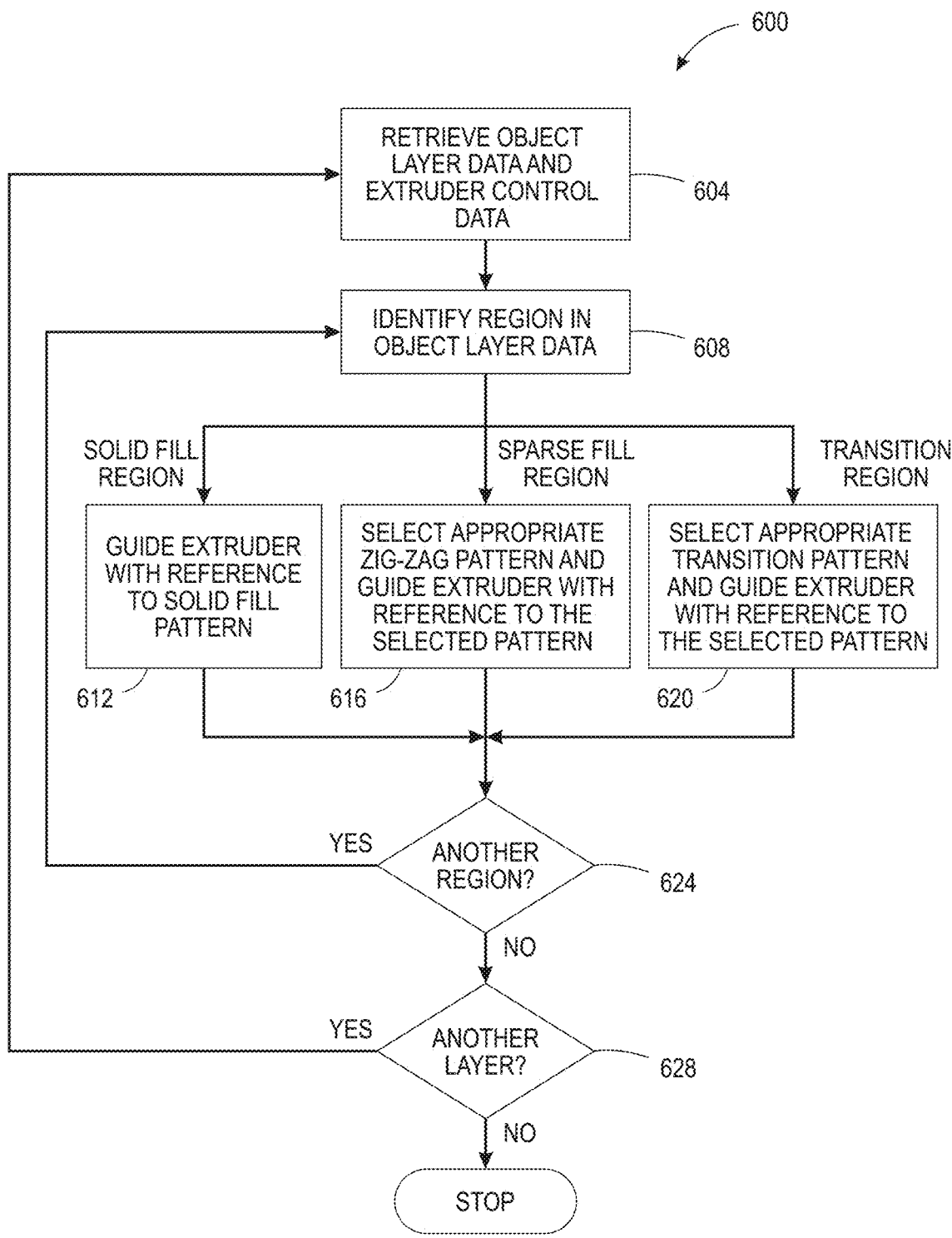
FIG. 6 is a flow diagram of a process used by the controllers of the additive manufacturing systems of FIG. 1 and FIG. 2 to move the extruders of those systems along predetermined sparse patterns that improve the structural integrity of the 3D object being formed.
Figure 7:
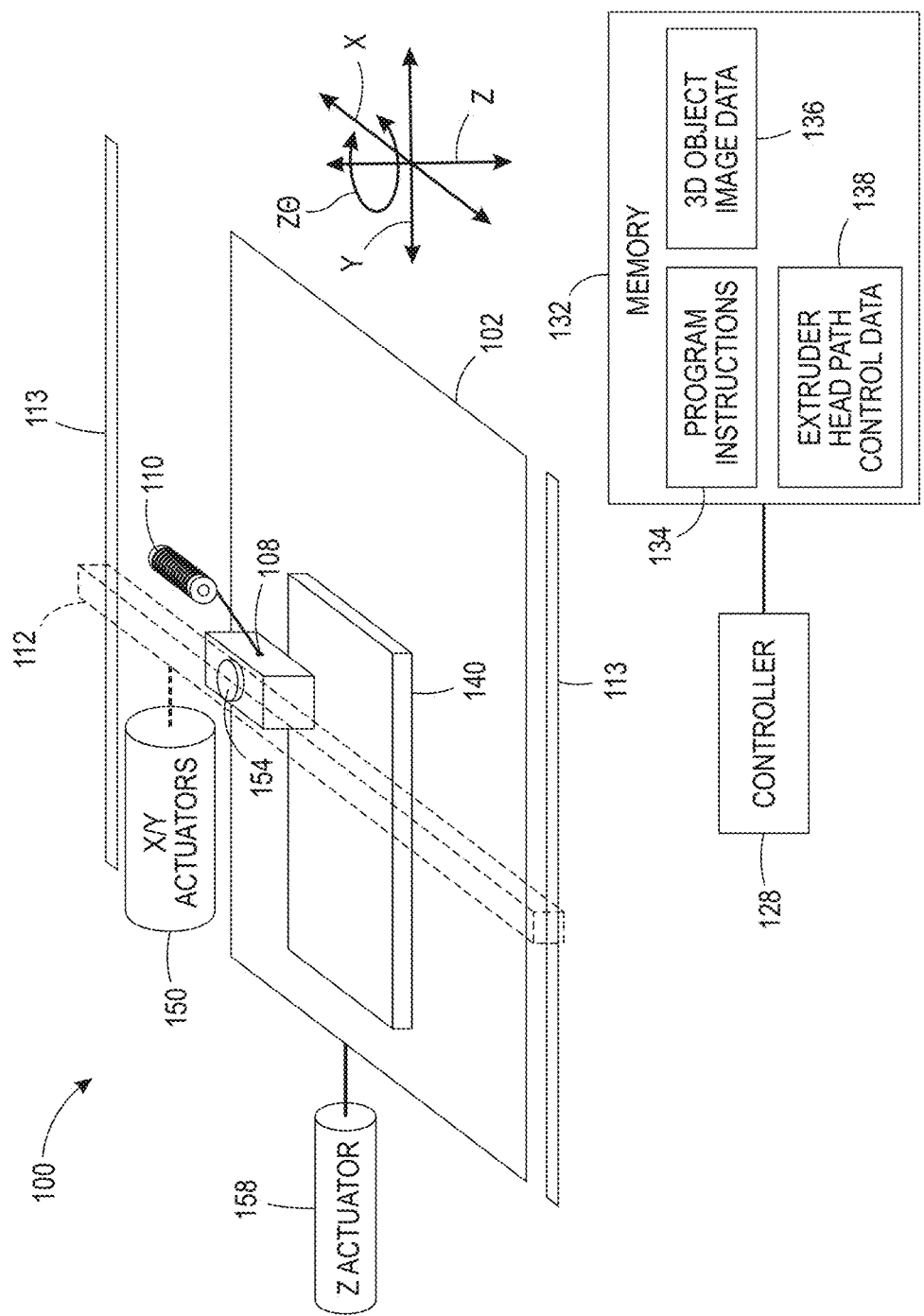
FIG. 7 depicts a prior art three-dimensional object additive manufacturing system or printer 100 that is configured to operate an extruder 108 to form a three-dimensional printed object 140.

FIG. 7 depicts a prior art three-dimensional object additive manufacturing system or printer 100 that is configured to operate an extruder 108 to form a three-dimensional printed object 140. The printer 100 includes a support member 102, a multi-nozzle extruder 108, extruder support arm 112, controller 128, memory 132, X/Y actuators 150, an optional Zθ actuator 154, and a Z actuator 158. In the printer 100, the X/Y actuators 150 move the extruder 108 to different locations in a two-dimensional plane (the "X-Y plane") along the X and Y axes to extrude swaths of thermoplastic material that form one layer in a three-dimensional printed object, such as the object 140 that is depicted in FIG. 7. For example, in FIG. 7 the X/Y actuators 150 translate the support arm 112 and extruder 108 along guide rails 113 to move the arm and extruder along the Y axis while the X/Y actuators 150 translate the extruder 108 along the length of the support arm 112 to move the extruder along the X axis. The extruded patterns include both outlines of one or more regions in the layer and swaths of the thermoplastic material that fill the regions within the outline of thermoplastic material patterns. The Z actuator 158 controls the distance between the extruder 108 and the support member 102 along the Z axis to ensure that the nozzles in the extruder 108 remain at a suitable height to extrude thermoplastic material onto the object 140 as the object is formed during the printing process. The Zθ actuator 154 controls an angle of rotation of the extruder 108 about the Z axis for some embodiments of the extruder 108 that rotate about the Z axis. This movement controls the process and cross-process separation between nozzles in the extruder 108, although some extruders do not require rotation during the manufacturing process. In the system 100, the X/Y actuators 150, Zθ actuator 154, and the Z actuator 158 are embodied as electromechanical actuators, such as electric motors, stepper motors, or any other suitable electromechanical device. In the printer of FIG. 6, the three-dimensional object printer 100 is depicted during formation of a three-dimensional printed object 140 that is formed from a plurality of layers of thermoplastic material.

Figure 2:
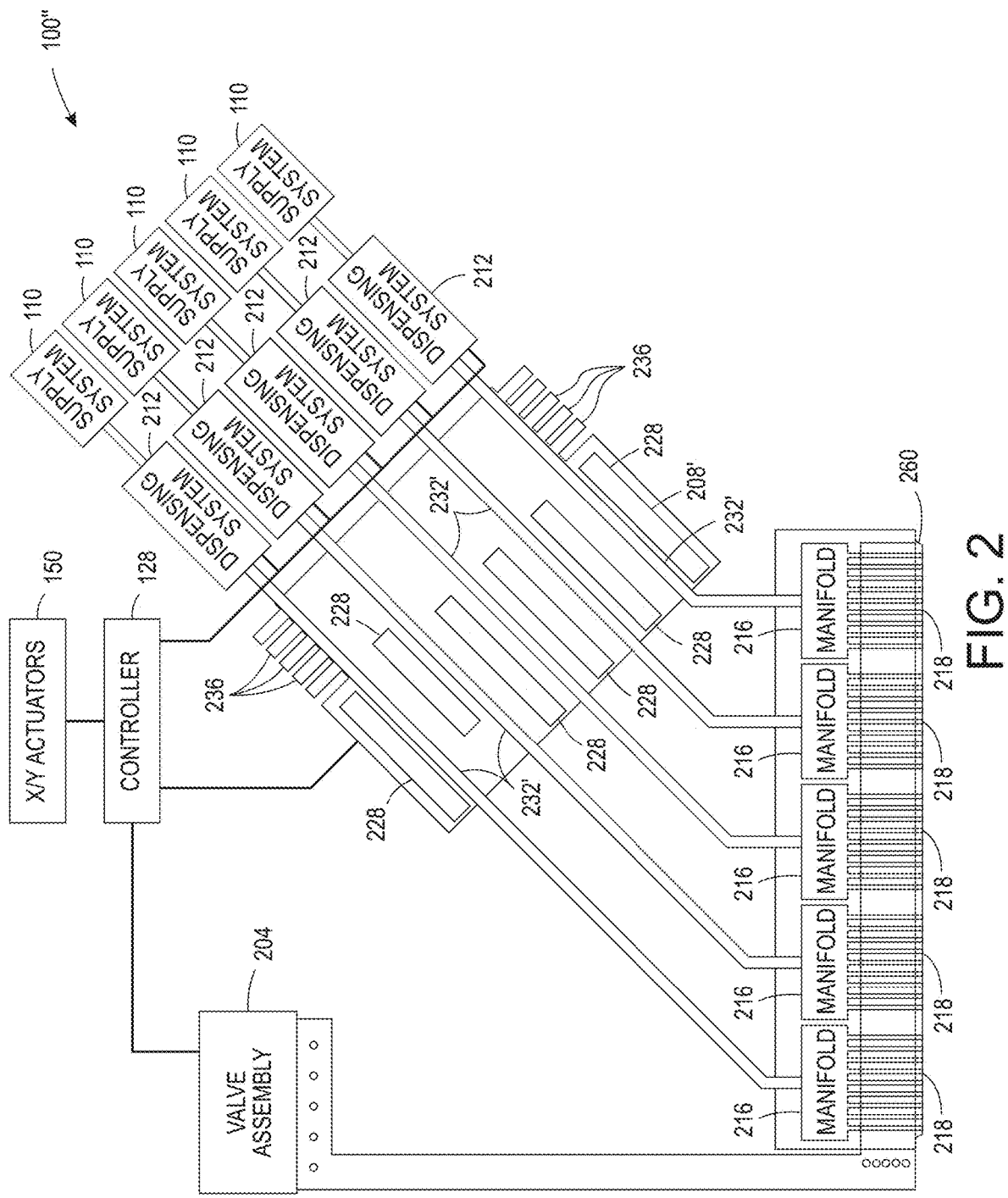
FIG. 2 depicts an alternative embodiment of an additive manufacturing system that operates a multi-nozzle extruder in a way that improves the structural integrity of areas filled with sparse patterns.

The support member 102 is a planar member, such as a glass plate, polymer plate, or foam surface, which supports the three-dimensional printed object 140 during the manufacturing process. In the embodiment of FIG. 2, the Z actuator 158 also moves the support member 102 in the direction Z away from the extruder 108 after application of each layer of thermoplastic material to ensure that the extruder 108 maintains a predetermined distance from the upper surface of the object 140. The extruder 108 includes a plurality of nozzles and each nozzle extrudes thermoplastic material onto the surface of the support member 102 or a surface of a partially formed object, such the object 140. In the example of FIG. 6, extrusion material is provided as a filament from extrusion material supply 110, which is a spool of ABS plastic or another suitable extrusion material filament that unwinds from the spool to supply extrusion material to the extruder 108.

The support arm 112 includes a support member and one or more actuators that move the extruder 108 during printing operations. In the system 100, one or more actuators 150 move the support arm 112 and extruder 108 along the X and Y axes during the printing operation. For example, one of the actuators 150 moves the support arm 112 and the extruder 108 along the Y axis while another actuator moves the extruder 108 along the length of the support arm 112 to move along the X axis. In the system 100, the X/Y actuators 150 optionally move the extruder 108 along both the X and Y axes simultaneously along either straight or curved paths. The controller 128 controls the movements of the extruder 108 in both linear and curved paths that enable the nozzles in the extruder 108 to extrude thermoplastic material onto the support member 102 or onto previously formed layers of the object 140. The controller 128 optionally moves the extruder 108 in a rasterized motion along the X axis or Y axis, but the X/Y actuators 150 can also move the extruder 108 along arbitrary linear or curved paths in the X-Y plane.

The controller 128 is a digital logic device such as a microprocessor, microcontroller, field programmable gate array (FPGA), application specific integrated circuit (ASIC) or any other digital logic that is configured to operate the printer 100. As used in this document, the term "controller" means one or more controllers, processors, or computers configured with programmed instructions to form a plurality of tasks to achieve a function. Thus, a controller for a printer can be multiple controllers that operate the extruder, move the extruder, process the object data, and optimize the filling of regions within an object being manufactured, as well as other tasks and functions. In the printer 100, the controller 128 is operatively connected to one or more actuators that control the movement of the support member 102 and the support arm 112. The controller 128 is also operatively connected to a memory 132. In the embodiment of the printer 100, the memory 132 includes volatile data storage devices, such as random access memory (RAM) devices, and non-volatile data storage devices such as solid-state data storage devices, magnetic disks, optical disks, or any other suitable data storage devices. The memory 132 stores programmed instruction data 134 and three-dimensional (3D) object image data 136. The controller 128 executes the stored program instructions 134 to operate the components in the printer 100 to form the three-dimensional printed object 140 and print two-dimensional images on one or more surfaces of the object 140. The 3D object image data 136 includes, for example, data defining cross-sectional views of an object on a layer-by-layer basis. Each data layer represents a layer of thermoplastic material that the printer 100 forms during the three-dimensional object printing process. The extruder path control data 138 include sets of geometric data or actuator control commands that the controller 128 processes to control the path of movement of the extruder 108 using the X/Y actuators 150 and to control the orientation of the extruder 108 using the Zθ actuator 154. The controller 128 operates the actuators to move the extruder 108 above the support member 102 as noted above while the extruder extrudes thermoplastic material to form an object.

FIG. 1 depicts an additive manufacturing system 100' having an extruder 108 that extrudes a plurality of thermoplastic materials through apertures in a faceplate. Although the printer 100' is depicted as a printer that uses planar motion to form an object, other printer architectures can be used with the extruder and the controller configured to regulate speed of the extruder with reference to the angular orientation of the extruder as described in this document. These architectures include delta-bots, selective compliance assembly robot arms (SCARAs), multi-axis printers, non-Cartesian printers, and the like. The motions in these alternative embodiments still have process and cross-process directions as defined above and the nozzle spacing in the extruders of these embodiments still define the nozzle spacing with respect to the cross-process direction. Only one manifold 216 is shown in FIG. 1 to simplify the figure, but the extruder 108 can have a plurality of manifolds 216. In one embodiment, each manifold 216 in the extruder 108 is operatively connected to a different heater 208 that is fed by a different extrusion material supply 110 in a one-to-one correspondence. Alternatively, each manifold 216 can be coupled to a single heater 208' that houses a plurality of channels 232' that are fed by a plurality of extrusion material supplies 110 as shown in the embodiment 100" of FIG. 2. Each channel 232' in FIG. 2 supplies thermoplastic material to a manifold 216 in the extruder 108 to enable each manifold to receive a material that is different than a material that the other manifolds are receiving. In the extruder 108, each nozzle 218 is fluidly connected to only one of the manifolds within the extruder 108 so each nozzle can extrude a thermoplastic material that is different than the materials extruded from nozzles connected to other manifolds. Extrusion from each nozzle is selectively and independently activated and deactivated by controller 128 operating the valves in the valve assembly 204. Each nozzle 218 is also aligned with an aperture in a faceplate 260 to configure the nozzles for more flexible formation of swaths of the materials in an object.

In the embodiments of FIG. 1 and FIG. 2, a valve assembly 204 positions a valve between the manifolds in the extruder 108 and each of the nozzles connected to the manifolds in the extruder 108. The valve assembly 204 is operatively connected to the controller 128 so the controller can open and close the valves for extruding thermoplastic material from the plurality of nozzles in the extruder 108. Specifically, the controller 128 activates and deactivates different actuators in the assembly 204 connected to the valves in the extruder 108 to extrude thermoplastic material from the nozzles and form swaths of different thermoplastic materials in each layer of a three-dimensional printed object, such as object 140 in FIG. 6.

The system 100' of FIG. 1 also includes an extrusion material dispensing system 212 for each heater 208 that is connected to a manifold in the extruder 108. The extrusion material from each separate supply 110 is fed to the corresponding heater 208 at a rate that maintains the pressure of the thermoplastic material in the manifold connected to the heater within a predetermined range during operation of the system 100'. The dispensing system 212 is one embodiment that is suitable for regulating pressure of the thermoplastic material in each manifold of the extruder 108. In embodiment 100" of FIG. 2, a plurality of extrusion material dispensing systems 212 are operatively connected between a plurality of extrusion material supplies 110 and a channel 232' in the heater 208' in a one-to-one correspondence. Additionally, in both embodiments, the controller 128 is operatively connected to an actuator each dispensing system 212 to control the rate at which the dispensing system 212 delivers extrusion material from a supply 110 to the heater fed by the supply. The dispensing systems 212 of FIG. 2 can be configured as the dispensing system 212 of FIG. 1. The heaters 208 and 208' soften or melt the extrusion material 220 fed to the heater 208 via drive roller 224 (FIG. 1). Actuator 240 drives the roller 224 and is operatively connected to the controller 128 so the controller can regulate the speed at which the actuator drives the roller 224. Another roller opposite roller 224 is free-wheeling so it follows the rate of rotation at which roller 224 is driven. While FIG. 1 depicts a feed system that uses an electromechanical actuator and the driver roller 224 as a mechanical mover to move the filament 220 into the heater 208 or 208', alternative embodiments of the dispensing system 212 use one or more actuators to operate a mechanical mover in the form of a rotating auger or screw. The auger or screw moves solid phase extrusion material from a supply 110 in the form of extrusion material powder or pellets into a heater 208 or 208'.

In the embodiments of FIG. 1 and FIG. 2, each heater has a body formed from stainless steel that includes one or more heating elements 228, such as electrically resistive heating elements, which are operatively connected to the controller 128. Controller 128 is configured to connect the heating elements 228 to electrical current selectively to soften or melt the filament of extrusion material 220 in the channel or channels within the heater 208 or 208'. While FIG. 1 and FIG. 2 show heater 208 and heater 208' receiving extrusion material in a solid phase as solid filament 220, in alternative embodiments, the heaters receive the extrusion material in solid phase as powdered or pelletized extrusion material. Cooling fins 236 attenuate heat in the channels upstream from the heater. A portion of the extrusion material that remains solid in a channel at or near the cooling fins 236 forms a seal in the channel that prevents thermoplastic material from exiting the heater from any opening than the connection to the manifold 216, which maintains a temperature that keeps the extrusion material in a thermoplastic state as it enters the manifold. The extruder 108 can also include additional heating elements to maintain an elevated temperature for the thermoplastic material within each manifold within the extruder. In some embodiments, a thermal insulator covers portions of the exterior of the extruder 108 to maintain a temperature within the manifolds within the extruder. Again, the regions around the nozzles in FIG. 2 are maintained at a temperature that keeps the material in a thermoplastic state so it does not begin solidifying as it travels to the apertures in the faceplate.

To maintain a fluid pressure of the thermoplastic material within the manifolds 216 within a predetermined range, avoid damage to the extrusion material, and control the extrusion rate through the nozzles, a slip clutch 244 is operatively connected to the drive shaft of each actuator 240 that feeds filament from a supply 110 to a heater. As used in this document, the term "slip clutch" refers to a device applies frictional force to an object to move the object up to a predetermined set point. When the range about the predetermined set point for the frictional force is exceeded, the device slips so it no longer applies the frictional force to the object. The slip clutch enables the force exerted on the filament 220 by the roller 224 to remain within the constraints on the strength of the filament no matter how frequently, how fast, or how long the actuator 240 is driven. This constant force can be maintained by either driving the actuator 240 at a speed that is higher than the fastest expected rotational speed of the filament drive roller 224 or by putting an encoder wheel 248 on the roller 224 and sensing the rate of rotation with a sensor 252. The signal generated by the sensor 252 indicates the angular rotation of the roller 224 and the controller 128 receives this signal to identify the speed of the roller 224. The controller 128 is further configured to adjust the signal provided to the actuator 240 to control the speed of the actuator. When the controller is configured to control the speed of the actuator 240, the controller 128 operates the actuator 240 so its average speed is slightly faster than the rotation of the roller 224. This operation ensures that the torque on the drive roller 224 is always a function of the slip clutch torque.

The controller 128 has a set point stored in memory connected to the controller that identifies the slightly higher speed of the actuator output shaft over the rotational speed of the roller 224. As used in this document, the term "set point" means a parameter value that a controller uses to operate components to keep the parameter corresponding to the set point within a predetermined range about the set point. For example, the controller 128 changes a signal that operates the actuator 240 to rotate the output shaft at a speed identified by the output signal in a predetermined range about the set point. In addition to the commanded speed for the actuator, the number of valves opened or closed in the valve assembly 204 and the torque set point for the clutch also affect the filament drive system 212 operation. The resulting rotational speed of the roller 224 is identified by the signal generated by the sensor 252. A proportional-integral-derivative (PID) controller within controller 128 identifies an error from this signal with reference to the differential set point stored in memory and adjusts the signal output by the controller to operate the actuator 240. Alternatively, the controller 128 can alter the torque level for the slip clutch or the controller 128 can both alter the torque level and adjust the signal with which the controller operates the actuator.

The slip clutch 244 can be a fixed or adjustable torque friction disc clutch, a magnetic particle clutch, a magnetic hysteresis clutch, a ferro-fluid clutch, an air pressure clutch, or permanent magnetic clutch. The clutch types that operate magnetically can have their torque set points adjusted by applying a voltage to the clutches. This feature enables the torque set point on the clutch to be changed with reference to print conditions. The term "print conditions" refers to parameters of the currently ongoing manufacturing operation that affect the amount of thermoplastic material required in the manifold for adequate formation of the object. These print conditions include the type of extrusion material being fed to the extruder, the temperature of the thermoplastic material being emitted from the extruder, the speed at which the extruder is being moved in the X-Y plane, the position of the feature being formed on the object, the angle at which the extruder is being moved relative to the platform, and the like.

In the embodiments shown in FIG. 1 and FIG. 2, the controller 128 is configured as described above with program instructions 134, object image data 136, and extruder head path control data 138 to identify a path of movement for the extruder in different regions of a layer and to transmit one or more signals to the X/Y actuators 150 to move the extruder 108 and to regulate the speed at which the extruder 108 is moved above platform 102. The controller 128 in FIG. 1 and FIG. 2 is configured with program instructions and head control data that includes sparse fill patterns and transition patterns that are used with object layer data as discussed in more detail below. The controller 128 is configured to regulate the speed of the extruder 108 with reference to the angle of the path at which the extruder 108 is to be moved and the orientation of the extruder faceplate as it moves along that path. The controller 128 is also configured with programmed instructions stored in a memory operatively connected to the controller that, when executed by the controller, enable the controller to generate signals for the X-Y actuators 150 that move the extruder 108 along a path that corresponds to the sparse fill and transition patterns as described more fully below.

When the controller 128 retrieves a layer of object data, it identifies the regions within the layer as solid fill regions, transition regions, and interior regions. Solid fill regions typically correspond to external surface regions, although they could also correspond to structures that need to be particularly rigid. Interior regions are typically sparsely filled regions since they are not observable and to the extent that the extrusion of build material in the region can be avoided, a cost and resource savings is achieved. Solid fill regions, however, cannot be formed directly over sparsely filled interior regions since much of the solid fill region would be unsupported and would fall into the sparsely filled region. To address this issue, transition regions are regions were extrusion material is placed at a density that is greater than a sparsely filled region, but not so great that extruded material would fall into the underlying sparsely filled area and be wasted. Transition regions increase in density in the Z-axis direction as they approach a solid fill region. Thus, the controller 128 identifies a distance between a top layer of a sparsely filled region and a position where a solid fill region is to be formed that corresponds to a number of transition regions needed to provide a top layer with sufficient support for the formation of the solid fill region at its intended position. Since the transition regions rely on the underlying sparsely filled regions for support, the sparsely filled regions need to provide adequate support structure without requiring amounts of extruded material beyond the identified fill percentage for the sparsely filled interior region.

Figure 3A:
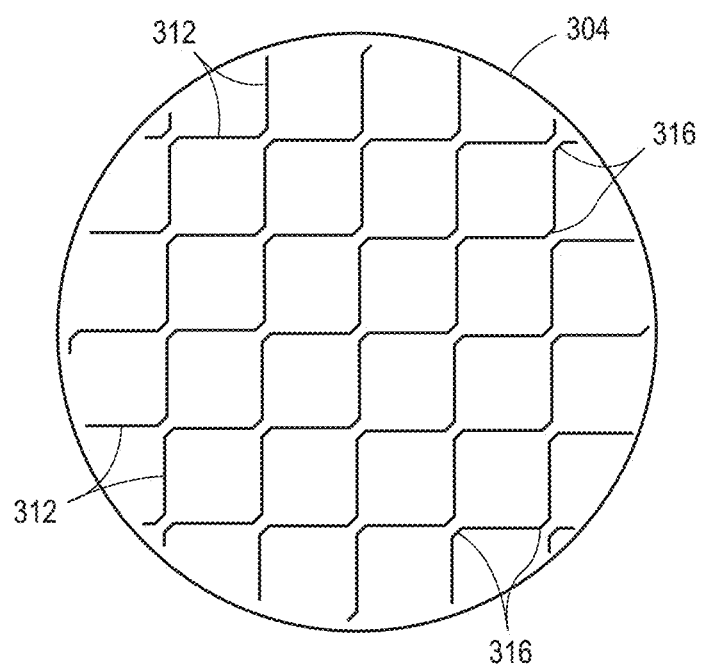
FIG. 3A and FIG. 3B illustrate two zig-zag patterns that can be used to sparsely fill interior regions of a 3D object without compromising the structural integrity of the regions.
Figure 3B:
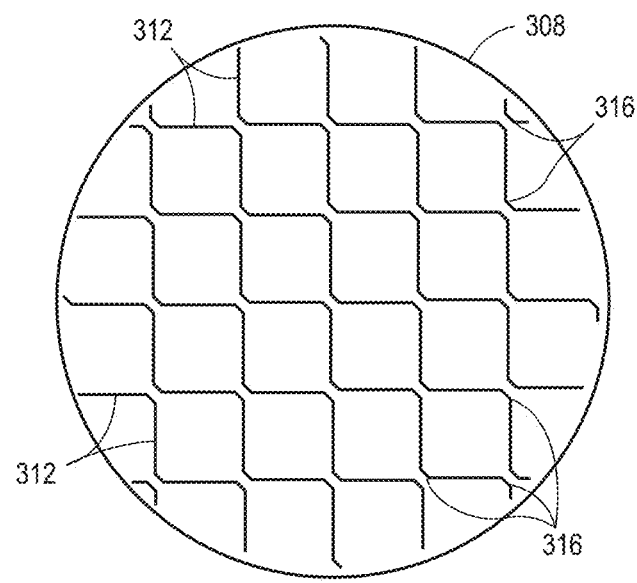
Figure 8:
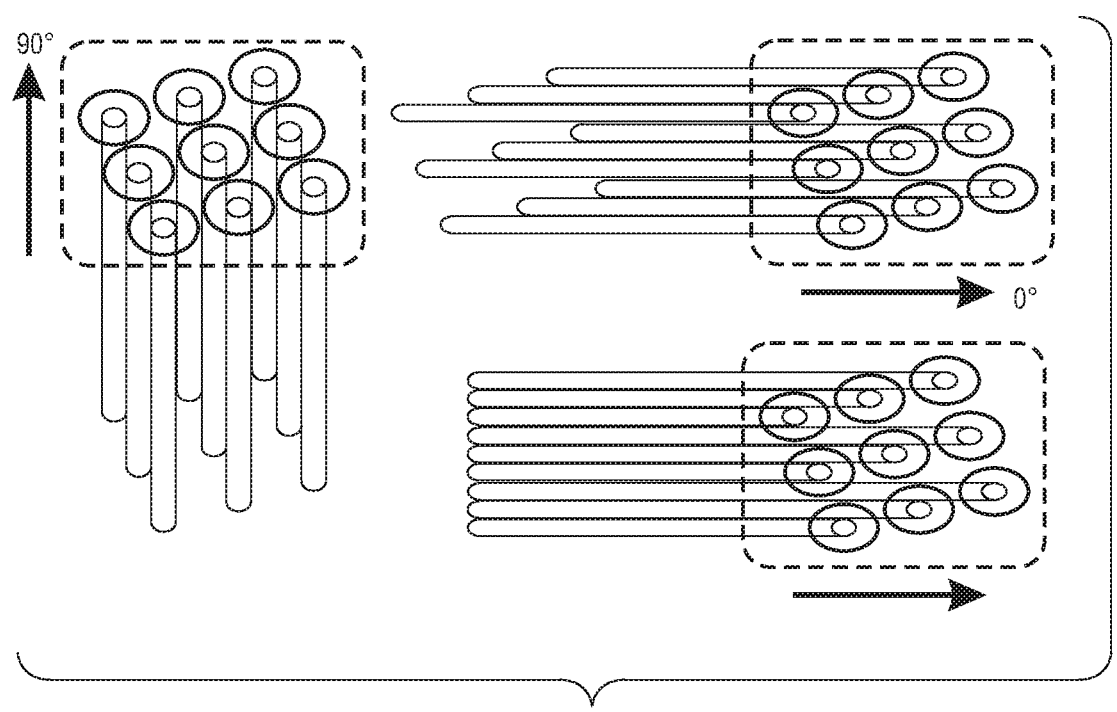
FIG. 8 depicts swaths that can be formed by a prior art nine nozzle faceplate when oriented at 0° and 90°.

When the controller 128 retrieves object layer data to form a layer of an object, the controller identifies solid fill regions, transition regions, and sparsely filled regions in the layer data. For sparsely filled regions, zig-zag patterns are used to guide the extruder and form support structure in these regions. FIG. 3A and FIG. 3B illustrate two zig-zag patterns that are used together to sparsely fill an interior area of an object layer and together they form improved supporting structure in sparsely filled areas. As used in this document, the term "sparsely fill" means to fill a three-dimensional (3D) interior region of an object to less than 100% and typically less than approximately 50% or less of the volume of the interior region with extruded material. Pattern 304 in FIG. 3A is oriented to form lines that are oriented on average along a 45°-225° axis to the horizontal orientation of the extruder along the 0°-180° axis, as shown in FIG. 8, while the pattern 308 in FIG. 3B is oriented to form lines that are oriented on average at a −45°-135° axis to the horizontal orientation of the extruder along the 0°-180° axis shown in FIG. 8. To use the pattern in FIG. 3A, the extruder is guided along a zig-zag path that extends from the lower left to the upper right at an average orientation of 45° off the horizontal. When it reaches the boundary of the interior region, the extruder is moved to the start of another zig-zag path and is guided to move from upper right to lower left at an average orientation of 225° until the boundary of the interior region is reached along that path. The pattern in FIG. 3B is used in a similar manner, except the paths are oriented on average at −45° off the horizontal when guided from upper left to lower right and on average at 135° off the horizontal when guided from lower right to upper left. Each path within a zig-zag pattern is comprised of straight portions 312 and angled portions 316. The straight portions 312 are oriented for extruder movement along the 0°-180° axis or the 90°-270° axis. The length of extruder movement performed with reference to the straight portions 312 in the zig-zag patterns can be altered to correspond with a fill percentage for the region being formed. The angled portions 316 are oriented with the 45°-225° axis or the −45°-135° axis. The controller 128 selects one of these patterns to form a layer of a support structure in an identified sparsely filled interior region and moves the extruder along a path corresponding to the selected pattern to form swaths. The reader should understand that swaths formed by the extruder following a line that proceeds from a lower left position to an upper right position in pattern 304 is wide enough to contact the adjacent swath at the angled portions 316 and that the adjacent swaths are typically printed with the extruder following a line that proceeds from the upper right to the lower left. The separation shown in the patterns 304 and 308 at the angled positions merely represents the path that the extruder is following and not the widths of the swaths actually produced by the extruder. Typically, all of the nozzles are open while using either pattern in FIG. 3A and FIG. 3B, although less than all of the nozzles could be open depending upon the size of the interior area and the percentage of fill to be achieved with the two patterns.

The first selected pattern, which can be the pattern in FIG. 3A or FIG. 3B, is used to sparsely fill a portion of a layer within an identified interior region with the swaths identified by the pattern. Prior to forming the swaths, the dimensions of the interior region are identified to correspond with the boundaries of an identified interior region in the object layer. Following the swaths being formed in the interior region of the object layer, the controller 128 operates the extruder in the other identified solid fill, sparsely filled, and transition regions of the current layer to finish formation of the object layer. The controller 128 then retrieves the next layer of the object and the next set of head control data to identify the various types of regions in the layer. For the interior region in the previous layer where the first selected pattern was used, the controller 128 selects the other zig-zag pattern and operates the extruder in the same manner to form swaths in the complementary direction on the swaths formed during use of the first selected pattern.

After the second pattern is used for the formation of the swaths in the identified interior region of the current layer, the controller 128 operates the extruder in the other identified solid fill, sparsely filled, and transition regions of the current layer to finish formation of the object layer. The controller 128 then retrieves the next layer of the object and the next set of head control data to identify the various types of regions in the layer. For the interior region in the previous layer where the pattern of FIG. 3B was used, the controller uses the first selected pattern to form the swaths associated with it and then uses the second pattern to form the swaths associated with it. This alternation of the two patterns for sparsely filling the interior area in the adjacent layers continues until the top layer of the support structure being formed by the swaths produced with reference to the two zig-zag patterns reaches a predetermined distance from a position where a solid fill structure is to be formed. Once this position is reached, the controller 128 identifies the interior region as a transition region and a set of transition patterns are used to fill in the remaining volume of the interior region area in subsequent layers at an increasing percentage of fill for each layer to provide a supporting surface for the solid fill structure or surface when the solid fill position is reached.

Figure 5A:
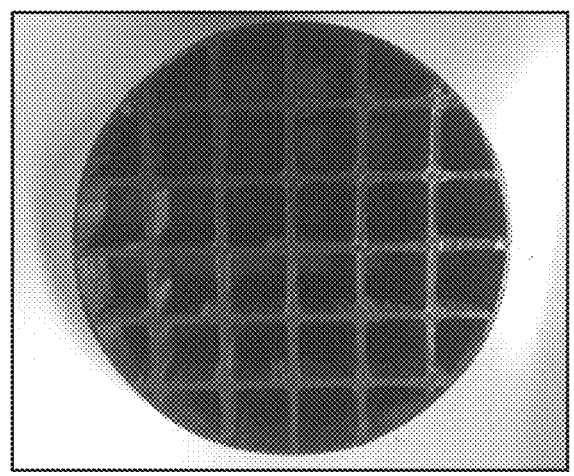
FIG. 5A is a bottom view of an interior region formed with the zig-zag patterns of FIG. 3A and FIG. 3B

Prior to discussing transition region extrusion, the advantages of the structures formed by the two patterns of FIG. 3A and FIG. 3B are noted. The alternating building of the swaths formed with reference to the complementary patterns in FIG. 3A or FIG. 3B forms structure with build material extruded at sparsely filled percentages that has greater rigidity and integrity than those previously known formed with material extruded at the same percentages. An example of an interior region formed using the pattern 304 from FIG. 3A and the complementary pattern 308 of FIG. 3B is shown from the bottom in FIG. 5A. The swaths printed with the first selected pattern and the swaths formed with the second selected pattern form solid corners at the angled portions of the patterns. These complementary zigzag patterns avoid crossing one another in a manner that makes the swaths discontinuous so the extrusion remains continuous during printing. As used in this document, the word "complementary" means swaths oriented at two different angles, one of which is a positive angle deviation from one of the two orthogonal axes for straight line movement of the extruder during swath formation and the other of which is a negative angle deviation from the same orthogonal axis.

The two patterns shown in FIG. 3A and FIG. 3B are used in an alternating fashion as described above to fill an interior area sparsely. Alternating the use of the patterns ensures that the angled portions of the swaths in the two patterns cross each other to form strong joints between the straight portions. These crossing angled portions help ensure that stronger joints are formed than by using either pattern alone to form joints with the straight portions only. The joints formed with the crossing angled portions enable the straight portions of zig-zag swaths to provide significant linear structural support across an interior region of a part at sparsely filled percentages. The strength of each linear structural support is determined by the width of the swaths, which is determined by the number of contiguous open valves in the extruder. The number and width of the swaths in a region of a part determines the strength of the structural support in that region. The wider the swaths, the fewer the number of swaths needed to provide a particular level of strength. The lengths of the straight portions need not be the same in all straight sections of a pattern. Furthermore, the length of the straight portions of swaths need not be the same in the two directions, horizontal and vertical. That is, the straight swath portions in the horizontal direction can be longer than the straight swath portions in the vertical direction or vice versa. The longer the straight portions of the swaths are in one of either the horizontal or the vertical direction, the fewer supporting structures are necessary in the other of the vertical and horizontal directions. Thus, shorter vertical or horizontal straight portions can be chosen across an interior region of a part where more strength is needed in either the horizontal or vertical directions.

In other embodiments, any square within a zig-zag pattern can be filled with some extrusion pattern. This extrusion pattern may be a smaller zig-zag pattern configured to provide some additional strength in a critical portion of a part. Alternatively, the extrusion pattern within a square might be some support pattern that does not necessarily provide additional structural strength, but could be useful for reducing the number of transition layers in an interior region or the quality of the transition layers to a solid surface of the part.

The controller 128 is also configured to operate the actuators to move the extruder differently at the angled portions 316 than it does at the straight portions 312. For one, the controller operates the actuators to move the extruder at the angles for the corners without rotating the extruder. To ensure a solid fill during this movement of the extruder at an angle other than 0° or 90°, the controller 128 operates the actuators 150 to slow the extruder as the opened nozzles extrude material. In an alternative embodiment, the controller 128 and the actuators 150 are configured to rotate the extruder to the optimum angle for the direction of extruder movement at the corners. In this embodiment, the movement of the extruder need not be slowed at the corners.

As noted above, the controller 128 alternates the use of the two patterns shown in FIG. 3A and FIG. 3B until a predetermined distance between a top layer of the support structure formed using the two patterns and a bottom layer where a solid fill structure is to be formed over the sparsely filled support structure is detected. At that position, the controller 128 identifies the interior region as a transition region and begins increasing the density of the swaths formed in subsequent layers until the position where the bottom layer of the solid fill structure is reached. Using a variety of techniques, these transition regions are formed in the subsequent layers until the solid fill layer is reached.

An example of transition region layer formation is now discussed. Other techniques or combinations of techniques can be used to achieve a supporting structure capable of resting on structure formed in sparsely filled interior regions and capable of fully supporting the solid fill layers. In the example set forth here, a plurality of different patterns is used to form the transition regions in different layers. These patterns differ from one another in type and in the number of swaths formed with the various patterns. Additionally, a pattern can be used multiple times to extend the widths of the swaths within a layer by increasing the number of open nozzles used to form a swath and by offsetting the extruder from one use in the layer to another use in the layer. Also, as the swaths get closer to one another, the extruder can be used to form bridges between swaths.

Figure 4:
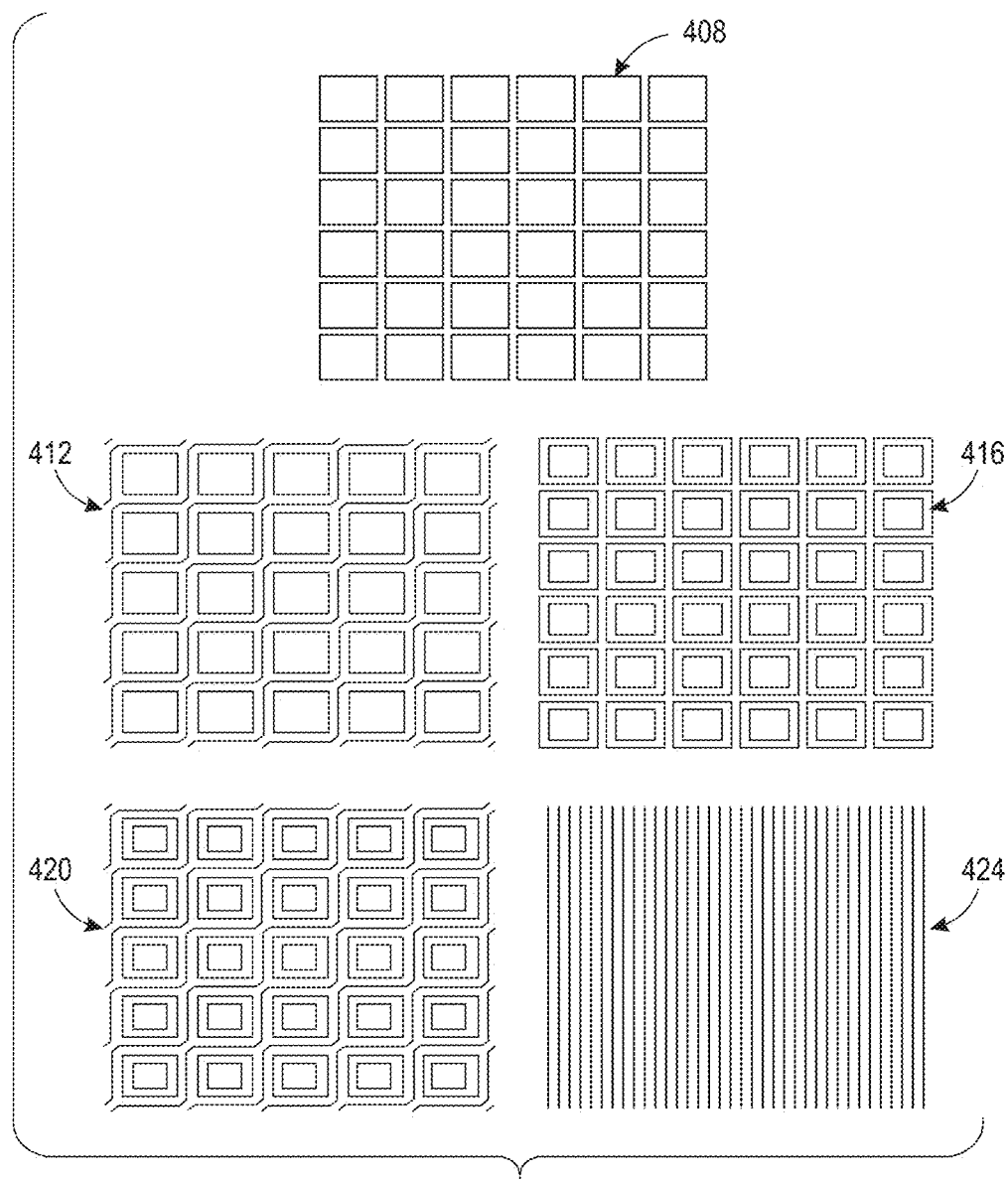
FIG. 4 illustrates a combination of transition patterns that can be successively used to fill a volume between a sparsely filled interior region of a 3D object and a position where a solid fill surface is to be formed so the solid fill surface is properly supported.

A group of transition patterns that can be used to form transition structure over the structure formed in sparsely filled interior regions is shown in FIG. 4. As used in this document, the term "transition pattern" refers to data used by a controller to move an extruder to form swaths in a volume of an interior region of an object between a sparsely filled interior region and a solid fill structure or surface.

In the group of patterns shown in FIG. 4, the patterns 408, 412, 416, and 420 are transition patterns, while pattern 424 is a pattern for formed a solid fill surface. Thus, pattern 424 is not a transition pattern, but is included for completeness to show the extruder movement for the first solid fill layer. The transition patterns are selected by the controller 128 in the order of 408, 412, 416, and 420. Afterwards, pattern 424 is selected to form a solid layer or surface over the swaths formed with the transition patterns. The patterns 412 and 420 are used for moving the extruder 108 to form an odd number of swaths in the transition region of a layer for the horizontal and vertical portions of the patterns. The patterns 408 and 416 are used for moving the extruder 108 to form an even number of swaths in the transition region of a layer for the horizontal and vertical portions of the patterns. The patterns 412 and 420 are zig-zag patterns since they contain angled paths. Though not shown, each zig-zag pattern 412 and 420 has a complementary zig-zag pattern, like FIG. 3A and FIG. 3B as described above, and these complementary patterns can be alternated in the same manner as the sparse fill zig-zag patterns of 3A and 3B to fill the interior region in multiple layers. The patterns 408, 416, and 424 are rectilinear patterns since they only contain horizontal and vertical straight paths. A square path within these patterns is printed in sequential swaths before moving on to another square. As used in this document, the term "zig-zag pattern" means data stored in a memory operatively connected to a controller that operates one or more actuators that move an extruder to enable the controller to guide the extruder along a path corresponding to the data and the path includes movement at an angle other than movement along the 0° or 90° paths. As used in this document, the term "rectilinear pattern" means data stored in a memory operatively connected to a controller that operates one or more actuators that move an extruder to enable the controller to guide the extruder along a path corresponding to the data and the path includes movement only along the 0° or 90° paths. Fewer patterns than the ones depicted in FIG. 4 may be needed to build transition structure to a solid surface if the sparse fill percentage is greater and more patterns may be needed if the sparse fill percentage is smaller.

The first time one of the transition patterns shown in FIG. 4 is used to control the movement of the extruder within a transition region of a layer, a first set of nozzles, which is less than all of the nozzles in the extruder faceplate, are opened to enable material to be emitted from the opened nozzles. When the extruder has produced a layer corresponding to the entirety of the selected pattern, the same pattern is used a second time to guide the movement of the extruder and form another group of swaths within the same layer with a second set of nozzles open. The second set of nozzles includes the first set of nozzles as well as additional nozzles in the extruder. During this second pass, the first set of nozzles place material on the material deposited in the layer previously and the additional nozzles in the second set of nozzles deposit material adjacent to the material emitted from the first set of nozzles. Since this additional material is not supported by material previously emitted in the layer, it may sag slightly, but it has enough coherency that it makes the swath formed during the second pattern use slightly wider than the swath formed during the first pattern use. In this manner, the width of swaths in the transition region of a layer can be increased. Subsequent uses of the pattern in this same layer either open the same nozzles of the immediately previous use or additional nozzles are opened. The use of the pattern in the layer continues until either all of the nozzles are open during the last use of the pattern or a predetermined swath width is reached during use of the pattern. In addition to opening additional nozzles for subsequent uses of a selected pattern, the extruder path can be offset by a predetermined amount from the path followed during the immediately previous use of the selected pattern. This offset coupled with the material emitted from the additional nozzles opened that may be added during a use of the pattern aid in joint formation. After a pattern is used once or multiple times in a transition region within a layer, the controller moves the extruder to other regions in the layer to either extrude material at solid fill, sparsely filled, or transition filled percentages.

Figure 5B:
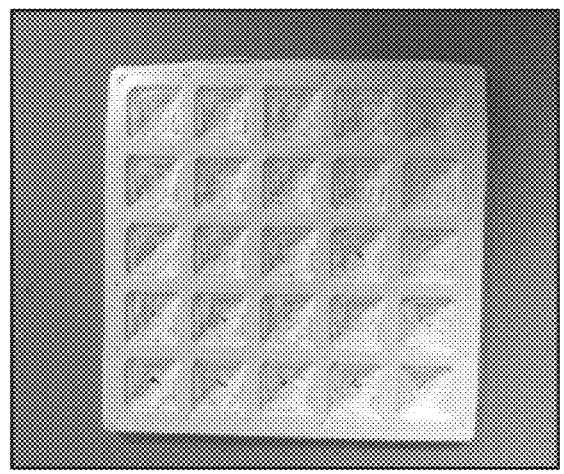
FIG. 5B is a bottom view of an interior region formed with the combination of patterns depicted in FIG. 4.

The controller 128 is configured with programmed instructions to select pattern 408 for moving the extruder 108 within a transition region of an object being manufactured. As noted above, this pattern is used to form an even number of swaths, namely, two, in the areas between squares in the pattern to enable widening transition swaths conforming to the pattern 408 to be formed as previously described. Once both swaths have been formed for a predetermined number of layers, the controller 128 selects the pattern 412 for extruder movement over the previously generated transition swaths. This pattern is used to form an odd number of swaths, namely, three, to enable widening transition swaths conforming to the pattern 412 to be formed in the layer. Once the three swaths have been formed, the controller 128 selects the pattern 416 for extruder movement over the previously generated transition swaths. This pattern is used to form an even number of swaths, namely, four, to enable widening transition swaths conforming to the pattern 416 to be formed in the layer. Once the three swaths have been formed, the controller 128 selects the pattern 420 for extruder movement over the previously generated transition swaths. This pattern is used to form an odd number of swaths, namely, five, to enable widening transition swaths conforming to the pattern 420 to be formed on one another. Once the five swaths have been formed, the controller 128 selects the pattern 424 for extruder movement over the previously generated transition swaths. This pattern is used to form a solid fill surface that covers the transition swaths in the transition regions and the sparsely filled swaths in the interior region. The pattern 424 can also be used to bridge open areas between swaths. Using the pattern 424 to move the extruder with all nozzles opened for each swath formed and slowing movement of the extruder over open regions between underlying swaths forms bridges between swaths. This process of bridging is typical in known 3D extrusion manufacturing and can be used to bridge openings between any layers in an object as long as the opening is not so large as to enable the bridging material to fall into the opening. An example of a sparsely filled interior region covered by material corresponding to the transition patterns 408 to 420 as described above is shown from the bottom in FIG. 5B.

FIG. 6 depicts a block diagram of a process 600 for moving and operating an extruder with reference to sparsely fill zig-zag patterns and transition patterns to fill interior regions of a 3D object and form supporting structure in those regions. In the discussion below, a reference to the process 600 performing a function or action refers to the operation of a controller, such as controller 128, to execute stored program instructions to perform the function or action in association with other components in the printer. The process 600 is described in conjunction with the printer 100' of FIG. 1 and printer 100" of FIG. 2 for illustrative purposes.

The process 600 begins with the controller retrieving object layer data and extruder control data from the memory operatively connected to the controller (block 604). The controller identifies a region within the object layer as a solid fill region, a sparsely filled region, or a transition region (block 608). For an identified solid fill region, an appropriate solid fill pattern is selected and used to guide the extruder while the extruder valves are operated (block 612). For an identified sparsely filled interior region, an appropriate zig-zag pattern is selected and used to guide the extruder while the extruder valves are operated (block 616). For an identified transition region, an appropriate transition pattern is selected and used to guide the extruder while the extruder valves are operated (block 620). Once swaths have been formed in the region using the appropriate pattern for the region, the process determines whether another region is to be formed in the layer (block 624). If another region is to be formed in the layer, the region type is identified (block 608) and the appropriate pattern is selected and used to form swaths in the identified region (blocks 612, 616, or 620). If no other region is to be formed in the layer, the process determines whether another layer is to be formed (block 628). If so, then the object layer data and extruder control data is retrieved (block 604) and the regions within the layer are processed (blocks 608 to 624). When all of the object layer data has been processed (block 628), the process stops.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A method for operating a three-dimensional (3D) object manufacturing system comprising:
    selecting with a controller a first zig-zag pattern from a plurality of zig-zag patterns stored in a memory operatively connected to the controller;
    operating an actuator with the controller to move an extruder in an interior region in a first object layer, the movement of the extruder being relative to a platform supporting an object being manufactured to form swaths in the interior region in the first object layer using the first zig-zag pattern to move the extruder while extruding thermoplastic material through a plurality of nozzles in the extruder, the swaths of thermoplastic material formed in the interior region of the first object layer having straight portions and angled portions in the interior region in the first object layer, the straight portions being formed as the extruder is moved along a pair of orthogonal axes, one orthogonal axis being oriented at 0°-180° and the other orthogonal axis being oriented at 90°-270° and the angled portions being formed as the extruder is moved along paths other than one of the orthogonal axes;
    selecting a second zig-zag pattern from the plurality of zig-zag patterns stored in the memory; and
    operating the actuator with the controller to move the extruder in the interior region in a second object layer that is adjacent to the first object layer, the movement of the extruder being relative to the platform to form swaths in the interior region in the second object layer using the second zig-zag pattern to move the extruder while extruding thermoplastic material through the plurality of nozzles in the extruder, the swaths of thermoplastic material in the interior region of the second object layer having straight portions and angled portions in the interior region in the second object layer, all of the angled portions in the first object layer being oriented at either a positive or negative deviation from one of the orthogonal axes and all of the angled portions in the second object layer being oriented at the other of the positive or negative deviation from the same one of the orthogonal axes.

2. The method of claim 1 further comprising:
    adjusting a speed for movement of the extruder while forming the angled portions of the swaths to be slower than a speed of movement of the extruder while forming the straight portions.

3. The method of claim 1 wherein the angled portions of the swaths formed in the first object layer using the first zig-zag pattern to move the extruder extend in a +45° angle from the one of the orthogonal axes and the angled portions of the swaths formed in the second object layer using the second zig-zag pattern to move the extruder extend in a −45° angle from the same one of the orthogonal axes.

4. The method of claim 1 further comprising:
    operating the actuator with the controller using the first zig-zag pattern to move the extruder to form at least one of the straight portions in the swaths with a length that is longer than a length of the other straight portions in the swaths formed using the first zig-zag pattern.

5. The method of claim 4 further comprising:
    operating the actuator using the first zig-zag pattern to move the extruder and form the at least one straight portion so all of the straight portions formed along one of the orthogonal axes have the longer length and the other straight portions formed along the other of the orthogonal axes do not have the longer length.

6. The method of claim 5, further comprising:
    operating the actuator with the controller to move the extruder using the first zig-zag pattern and a percentage of fill for the interior region to form the straight portions of the swaths having the longer length.

7. The method of claim 1 further comprising:
    operating the extruder with the controller to open every nozzle in the plurality of nozzles in the extruder while moving the extruder using the first zig-zag pattern and using the second zig-zag pattern.

8. The method of claim 1 further comprising:
    operating the actuator with the controller to move the extruder using the second zig-zag pattern to position the angled portions of the swaths formed using the second zig-zag pattern adjacent to the angled portions of the swaths formed by moving the extruder using the first zig-zag pattern.

9. The method of claim 1 further comprising:
    alternating movement of the extruder using the first zig-zag pattern for movement of the extruder in odd-numbered layers and using the second zig-zag pattern for movement of the extruder in even-numbered layers until the swaths formed with the thermoplastic material reach a predetermined distance from a position where a solid fill surface is formed.

10. The method of claim 9 further comprising:
    selecting with the controller a first transition pattern from a plurality of transition patterns; and
    moving the extruder with the controller in an interior region in a first object layer in which the first transition pattern is used for extruder movement that is adjacent to a latest formed odd-numbered or even-numbered object layer in which one of the first zig-zag pattern and the second zig-zag pattern was used, the movement of the extruder using the first transition pattern occurring while extruding thermoplastic material through the plurality of nozzles of the extruder to form swaths of thermoplastic material on the swaths previously formed in the latest formed odd-numbered or even-numbered object layer in which one of the first zig-zag pattern and the second zig-zag pattern was used to move the extruder.

11. The method of claim 10 further comprising:
moving the extruder with the controller in an interior region in a second object layer in which the first transition pattern is used for extruder movement, the second object layer in which the first transition pattern is used for extruder movement is adjacent to the first object layer in which first transition pattern was used, the movement of the extruder in the second object layer in which the first transition pattern is used is made using the first transition pattern while extruding thermoplastic material through the plurality of nozzles of the extruder to form swaths of thermoplastic material on the swaths previously formed in the first object layer in which the first transition pattern was used to move the extruder.

12. The method of claim 11 further comprising:
operating the extruder with the controller using the first transition pattern in the first object layer in which the first transition pattern is used for extruder movement with a first number of nozzles in the plurality of nozzles open, the first number of nozzles being less than all of the nozzles in the plurality of nozzles; and
operating the extruder with the controller using the first transition pattern in the second object layer in which the first transition pattern is used for extruder movement with a second number of nozzles in the plurality of nozzles open to place a wider swarth of thermoplastic material on the swarth formed in the first object layer in which the first transition pattern is used for extruder movement, the second number of nozzles being greater than the first number of nozzles.

13. The method of claim 10 further comprising:
selecting with the controller a second transition pattern from the plurality of transition patterns;
using the second transition pattern to move the extruder with the controller in an interior region in a next object layer formed after the first object layer in which the first transition pattern was used for extruder movement while extruding thermoplastic material through the plurality of nozzles of the extruder to form swaths of thermoplastic material on the swaths formed using the first transition pattern to move the extruder.

14. The method of claim 13 wherein a number of swaths formed using the first transition pattern for extruder movement is different than a number of swaths formed using the second transition pattern for extruder movement.

15. The method of claim 14 wherein the number of swaths formed using the first transition pattern for extruder movement is an even number and the number of swaths formed using the second transition pattern for extruder movement is an odd number.

16. The method of claim 13 wherein the swaths formed while using the first transition pattern for extruder movement have straight portions formed as the extruder is moved along one of the orthogonal axes and angled portions formed as the extruder is moved along paths other than one of the orthogonal axes and the second transition pattern is a rectilinear pattern that is used to move the extruder along the orthogonal axes only; and the method further comprises:
operating the extruder with the controller using the rectilinear pattern to extrude thermoplastic material through the plurality of nozzles of the extruder to form swaths of thermoplastic material having only straight portions formed along the orthogonal axes.

17. The method of claim 16 further comprising:
operating the extruder with the controller using the rectilinear pattern with a first number of nozzles in the plurality of nozzles open to form the swaths on at least a portion of the swaths formed while the extruder is moved using the first transition pattern; and
operating the extruder with the controller using the rectilinear pattern with a second number of nozzles in the plurality of nozzles open to increase a width of at least one of the swaths previously formed while the extruder was moved using the rectilinear pattern and the first number of nozzles was open, the second number of nozzles being greater than the first number of nozzles.

18. The method of claim 16 further comprising:
adjusting a speed for movement of the extruder to be slower while crossing an opening between previously formed swaths.

19. The method of claim 1 wherein the swaths formed using the first zig-zag pattern to move the extruder position the angled portion of at least one swath adjacent to the angled portion of an adjacent swath.

* * * * *